United States Patent [19]

Yamamoto

[11] Patent Number: 4,491,874
[45] Date of Patent: Jan. 1, 1985

[54] SYSTEM FOR DISPLAYING PICTURE INFORMATION

[75] Inventor: Kazuhiko Yamamoto, Yokosuka, Japan

[73] Assignee: Tokyo Shibaura Denki Kabushiki Kaisha, Kawasaki, Japan

[21] Appl. No.: 316,482

[22] Filed: Oct. 29, 1981

[30] Foreign Application Priority Data

Oct. 31, 1980 [JP] Japan ................... 55-153252

[51] Int. Cl.³ ............................................ H04M 1/22
[52] U.S. Cl. .................... 358/296; 358/301;
358/260; 364/518; 360/14.2
[58] Field of Search ............... 358/903, 102, 133, 260,
358/287, 301; 364/518, 521, 523, 519, 520, 522;
360/14.2, 14.3, 72.3

[56] References Cited

U.S. PATENT DOCUMENTS

| 3,980,994 | 9/1976 | Ying et al. | 340/172.5 |
| 4,041,463 | 8/1977 | Slutzky et al. | 364/900 |
| 4,161,757 | 7/1979 | Spencer et al. | 359/261 |
| 4,196,450 | 4/1980 | Miller et al. | 358/903 |

OTHER PUBLICATIONS

G. L. Anderson et al., "Hardware Allocation of Data System Resources", Computer Design, vol. 13, No. 7, Jul. 1974, Concord pp. 89-97.
JP-A-55-108076, (19 Aug. 1980) & Patent Abstracts of Japan, vol. 4, No. 160, 8 Nov. 1980, p. 105P35.
Patent Abstracts of Japan, vol. 5, No. 138, Sep. 2, 1981 & JP-A-56-72769.
Patent Abstracts of Japan, vol. 5, No. 92, Jun. 16, 1981 & JP-A-56-36765.

Primary Examiner—John C. Martin
Assistant Examiner—Edward L. Coles
Attorney, Agent, or Firm—Cushman, Darby & Cushman

[57] ABSTRACT

A 2-dimension scanning device scans picture information. When one-page picture information is stored into a page buffer, it is displayed by a display unit. Thereafter, when an operator depresses an abandon key, the picture information is abandoned. When the operator depresses a record key, the picture information is recorded on a recording medium. The picture information is read out and displayed by the display unit, whenever necessary. The picture information is deleted from the recording medium when a delete key is operated. When a recognition key is operated, a retrieval title corresponding to the picture information is recorded on the recording medium.

8 Claims, 11 Drawing Figures

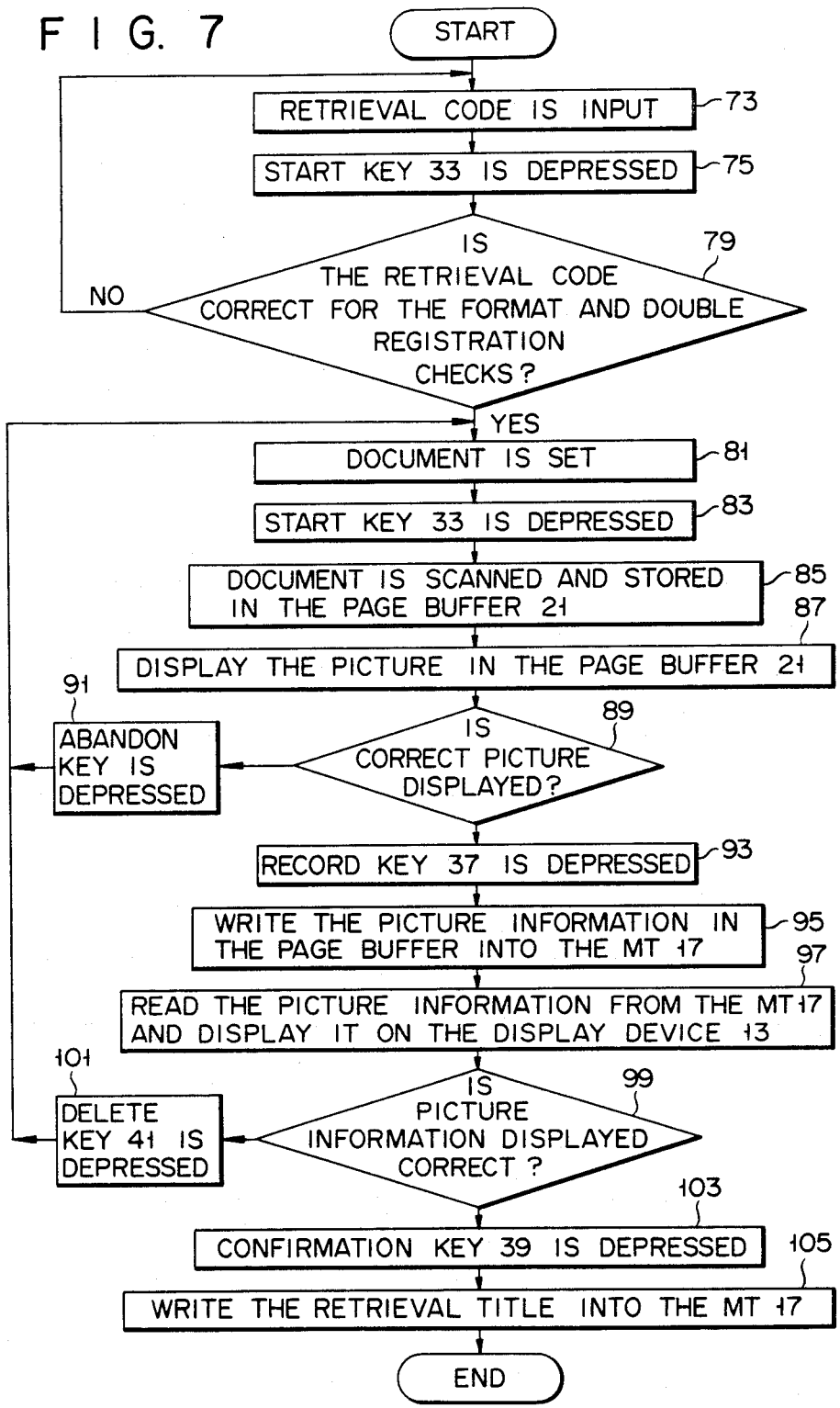

F I G. 10
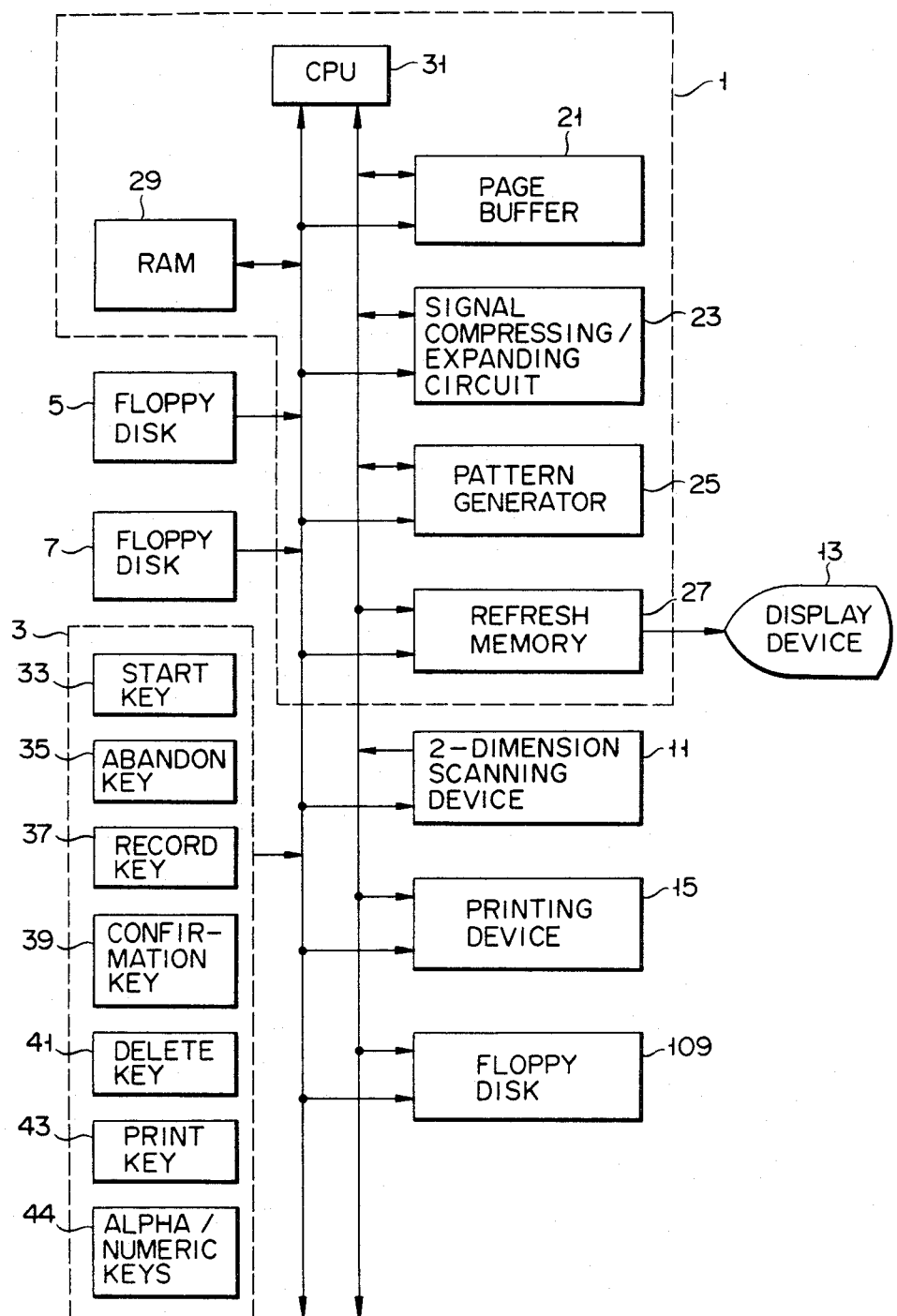

SYSTEM FOR DISPLAYING PICTURE INFORMATION

BACKGROUND OF THE INVENTION

The present invention relates to a system for displaying picture information, which is capable of recording picture information such as a document and which is capable of retrieving and outputting the recorded picture information as needed.

A conventional system for storing and retrieving a document picture is known wherein pictures reduced in scale are directly recorded on microfilms. As an improvement over this system, a picture information file device has been proposed which utilizes photoelectric conversion techniques with a laser beam or CCD elements. The techniques decompose a document picture into picture elements, converts the picture elements into picture signals, and records the picture signals on a magnetic recording medium at a high density.

However, with this type of device it is impossible to ascertain whether or not the picture information is recorded on a magnetic recording medium in such state that it may be reproduced whenever necessary. If an original (or document) is placed slantwise or folded or if the original picture is not clear, the picture information recorded will inevitably be deformed or unclear.

SUMMARY OF THE INVENTION

It is an object of the present invention to provide a system for displaying picture information, which can ascertain whether or not picture information recorded on a magnetic recording medium is a normal one and which can thus serve to write exclusively normal picture information into a picture information file device.

In order to achieve the above object, there is provided according to the present invention, a system for displaying picture information in a picture information file device which stores picture information and a retrieval title including a retrieval code for retrieving the picture information and which outputs picture information corresponding to an input retrieval code, including:

(a) a control information input device comprising a keyboard having an abandon key for specifying abandonment of the picture information, a record key for specifying recording of the picture information, a delete key for specifying deletion of the picture information, and a recognition key for specifying recording of normal picture information;

(b) a 2-dimension scanning device which two-dimensionally scans the picture information for photoelectric conversion and outputs the photoelectrically converted picture information;

(c) a magnetic tape device for recording the photoelectrically converted picture information;

(d) a display device for displaying picture information recorded or to be recorded by said magnetic tape device; and (e) a control device which has a programmable microprocessor connected to said control information input device, said 2-dimension scanning device, said magnetic tape device and said display device, and which includes a central processing unit for receiving input signals for controlling the recording, abandonment, deletion of the picture information and recognition of recording of normal picture information, a read-only memory device for storing permanent program, a random access memory for storing data input by said control information input device, and buffer means for temporarily storing the picture information from said 2-dimension scanning device, said read-only memory device storing the permanent programs having functions of said central processing unit so that said control device may perform specific functions according to the permanent programs;

wherein said control information input device, said 2-dimension scanning device and said magnetic tape device are so controlled that said 2-dimension scanning device stores the picture information into said buffer means, the contents of the buffer means are read out and displayed by said display device, said picture information stored in said buffer means is abandoned when said abandon key is operated, recorded by said magnetic tape device and displayed by said display device when said record key is operated, and deleted from said magnetic tape device when said delete key is operated, and said retrieval title is recorded by said magnetic tape device when said recognition key is operated.

According to the present invention, since any picture information that is to be recorded on a magnetic recording medium is displayed, the information can be checked and only normal picture information can thus be recorded on the magnetic recording medium.

BRIEF DESCRIPTION OF THE DRAWINGS

Other objects and features of the present invention will be apparent from the following description taken in connection with the accompanying drawings, in which:

FIGS. 6A and 6B are views showing the recording formats of retrieval titles and picture information written in the tracks of the cassette tape shown in FIG. 5, wherein FIG. 6A shows the recording format of the retrieval titles and FIG. 6B shows the recording format of the picture information;

FIG. 7 is a flow chart showing the control operation of the main control device for performing registering of picture information; and FIGS. 8 to 10 show modifications of the embodiment of the present invention shown in FIG. 3, wherein FIG. 8 is a block diagram of a system which uses a magnetic disk device in place of a magnetic tape device shown in FIG. 3, FIG. 9 is a block diagram of a system which stores control programs in a floppy disk in place of a ROM, and FIG. 10 is a block diagram showing a system which stores the control programs in a floppy disk in place of the ROM and which uses a magnetic disk device in place of the magnetic tape device.

DETAILED DESCRIPTION OF THE PREFERRED EMBODIMENT

Figure 1:
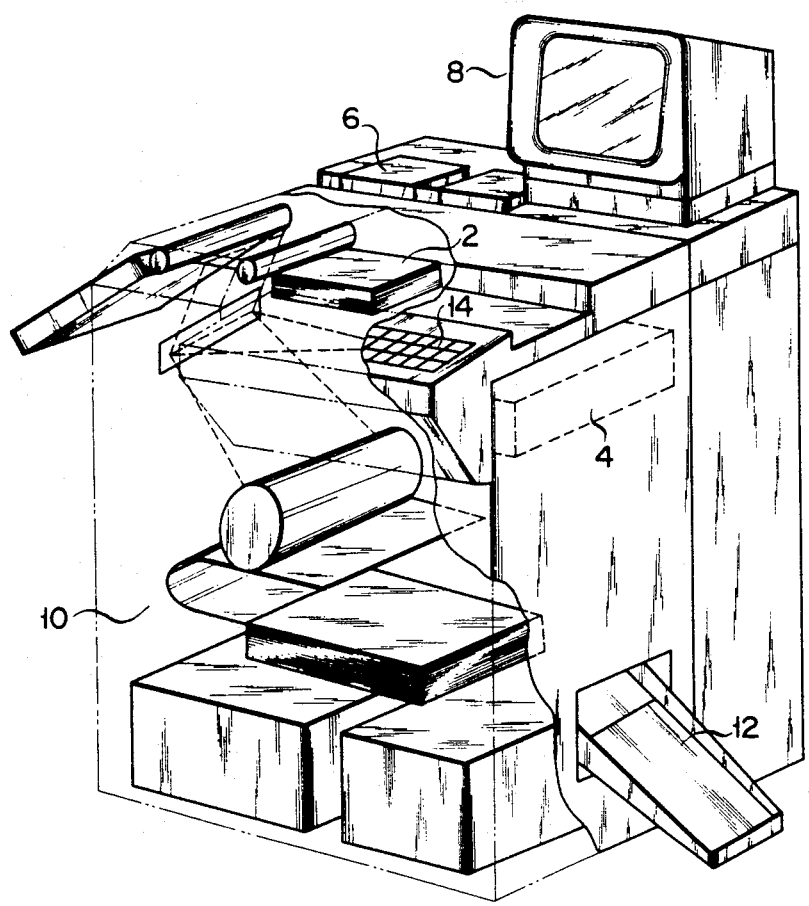
FIG. 1 is a schematic view of a picture information file device to which the recording system of picture information according to the present invention is applied.

FIG. 1 is a schematic view of a picture information file device to which the recording system of picture information of the present invention is applied. Referring to FIG. 1, when an original is set on an original table 2, the original is subjected to 2-dimensional scanning by a laser scanning system 4 for reading the picture information. The picture information is recorded on a magnetic tape 6. The picture information recorded on the magnetic tape 6 is retrieved according to a retrieval code input from a keyboard and displayed at a display device 8. If necessary, a hard copy 12 is prepared by an electrophotographic processing system 10.

Figure 2:
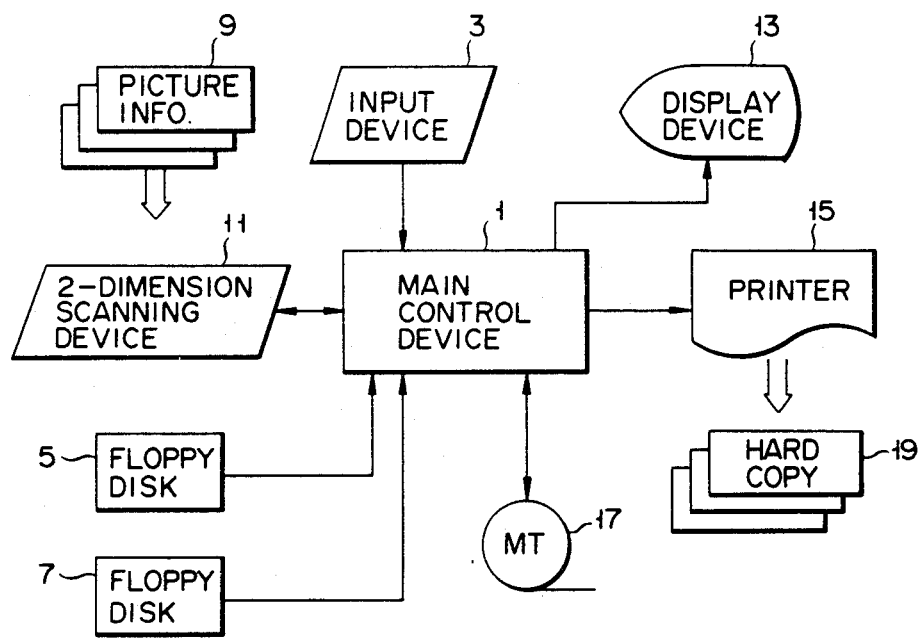
FIG. 2 is a block diagram showing an embodiment of the recording system of picture information of the present invention.

FIG. 2 is a block diagram showing the configuration of a system for storing and retrieving picture information according to the present invention. According to input information from an input device 3 (for example, a keyboard), a main control device 1 performs editing processes such as recording, reproduction, addition, insertion, deletion and so on of picture information and retrieval titles; and controls devices connected to this main control device 1. First and second floppy disks 5 and 7 store application programs, and the main control device 1 performs control according to these application programs.

Picture information 9 such as a document is photoelectrically converted by 2-dimensional scanning by a 2-dimension scanning device 11. The photoelectrically converted picture information (video signal) is supplied through the main control device 1 to a display device 13 such as a CRT display, and a printer 15 or a magnetic tape device 17. The 2-dimension scanning device 11 includes a switch (not shown) for controlling the binary encoding level according to the density of the original. The display device 13 displays the retrieval title from the keyboard 3, and the picture information from the 2-dimension scanning device 11 or from the magnetic tape device 17. The printer 15 receives the picture information from the 2-dimension scanning device 11 or from the magnetic tape device 17 and forms a 2-dimensional visible image, which is output as a hard copy 19.

Figure 3:
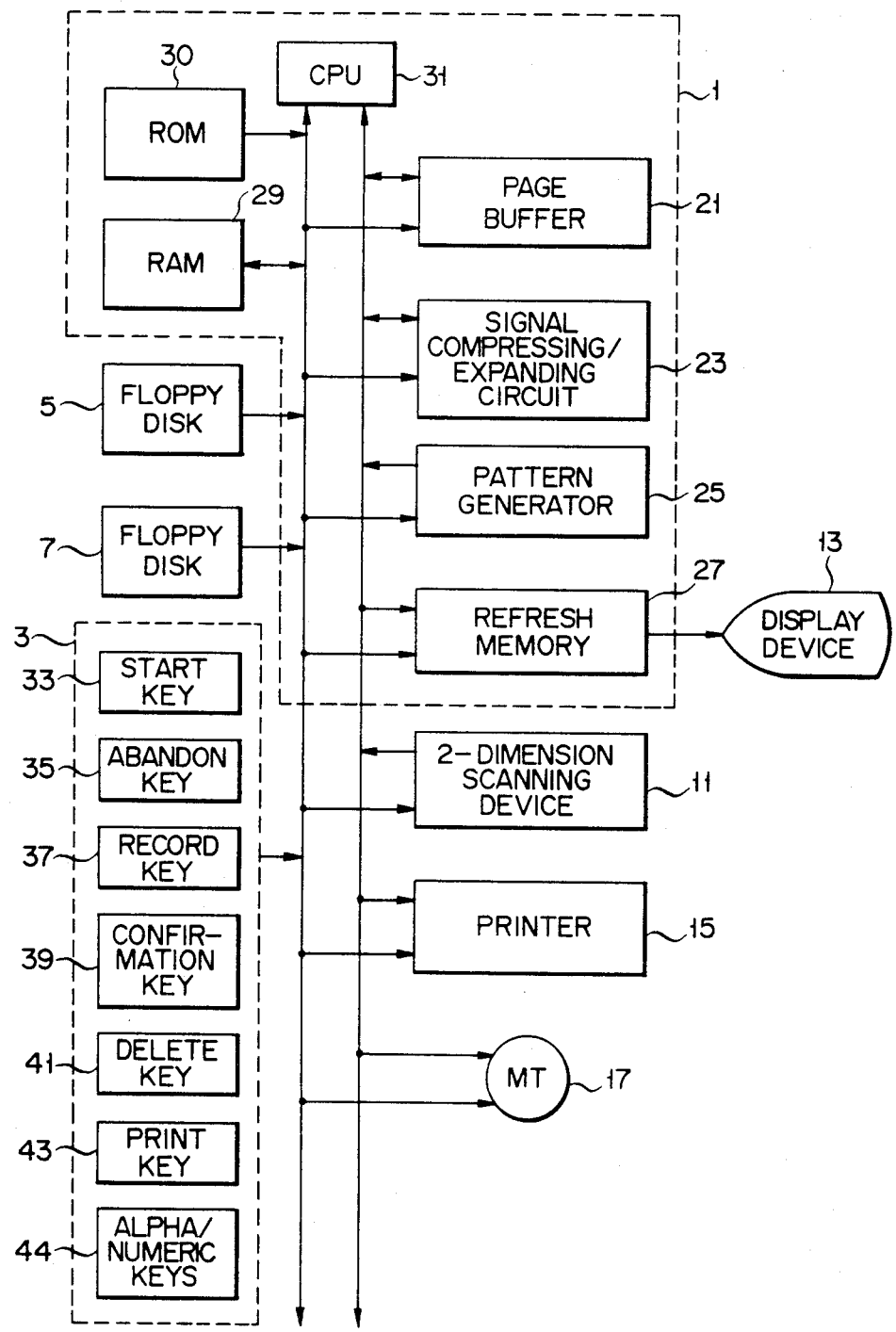
FIG. 3 is a detailed block diagram showing a main control device and an input device shown in FIG. 2.

FIG. 3 is a block diagram showing in detail the main control device and the input device shown in FIG. 2. The main control device 1 comprises a page buffer 21 for storing the picture information in units of pages, a signal compressing/expanding circuit 23 for performing signal compression and expansion by the MH (modified Hoffman) conversion or the MH inverse conversion, a pattern generator 25 for generating a character pattern, a refresh memory 27 for storing information to be displayed at the display device 13, a random access memory (RAM) 29 having a capacity sufficient to store the retrieval titles corresponding to one magnetic tape to be described later, and a central processing unit (CPU) 31 for controlling these circuits. An 8-bit microprocessor 8085 available from Intel. Corp., U.S.A. may be adopted as the CPU 31. A read-only memory (ROM) device 30 is externally connected to the CPU 13 and stores control programs to control the devices described above according to the registering mode, the retrieval mode, and the deletion mode of picture information.

The input device (keyboard) 3 includes a start key 33 which is depressed for storing a retrieval title or for setting the original, an abandon key 35 which is depressed for abandoning the picture information stored in the page buffer 21, a record key 37 which is depressed for recording the picture information stored in the page buffer 21 on a magnetic tape to be described later, a confirmation key 39 which is depressed when the picture information recorded on the magnetic tape is satisfactory, a delete key 41 which is depressed for deleting the picture information stored on the magnetic tape, a print key 43 which is depressed when the hard copy 19 of the picture information stored in the page buffer 21 is necessary, and alpha/numeric keys 44 for numerals 0 to 9 and for letters of the alphabet.

Figure 4:
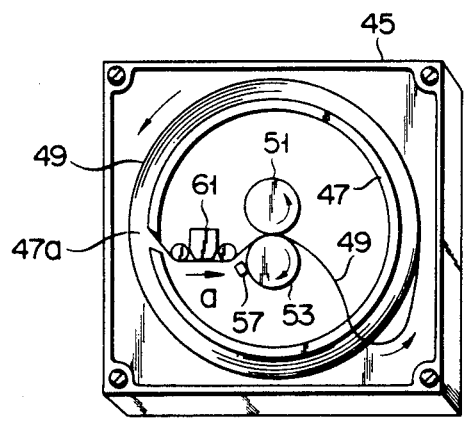
FIG. 4 is a view schematically showing a cassette tape of a magnetic tape device and a tape feed mechanism shown in FIGS. 2 and 3.
Figure 5:
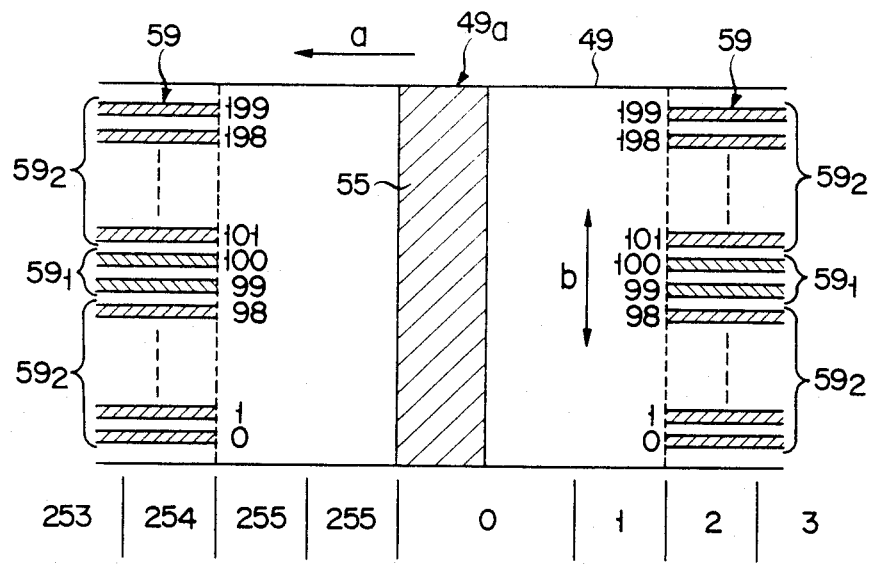
FIG. 5 is a view showing the configuration of tracks of the cassette tape shown in FIG. 4.

FIG. 4 is a schematic view showing a cassette tape and a feed mechanism of the magnetic tape device 17. Inside a casing 45 is disposed a stationary reel 47 which does not rotate and around which is wound magnetic tape 49 of, for example, ½ inch width (about 12.7 mm) and about 36 m length. When the cassette tape of this construction is mounted, the innermost turn of the tape is guided outside through a window 47a formed in the reel 47, is fed at high speed (about 5 m/sec) in the direction shown by arrow a in the figure by a capstan 51 and a pinch roller 53, and is then wound around the outermost turn of the tape 49. Therefore, the tape 49 completes one course in about 7.2 seconds. This one travel of the tape is confirmed by optically detecting at a mark detector 57 a tape mark 55 such as a silver paper chip attached to a connecting part 49a of the tape 49 as shown in FIG. 5. The output from the detector 57 is used as a reference for detecting a block position (to be described later) on the tape 49. Thus, 200 recording tracks 59 (of about 40 μm width and about 52 μm pitch) are formed parallel to each other along the direction of arrow a on the tape 49 as shown in FIG. 5. Track numbers "0, 1, 2, . . . , 198, 199" are sequentially assigned to the recording tracks 59 from the lowermost track. Two substantially central tracks (track numbers 99 and 100 of which track number 99 is auxiliary) define a recording track $59_1$ which records an inherent retrieval title (consisting of the retrieval code and the recording address which, in turn, consists of the track number and the block number) corresponding to picture information of one unit; and the remaining 198 recording tracks (track numbers 0 to 98 and 101 to 199) define information recording tracks $59_2$ for recording the picture information. Each recording track 59 is divided into 256 blocks in the longitudinal direction of the tape as shown in FIG. 5; each block is sequentially assigned block numbers "0, 1, 2, . . . , 254, 255" starting from the tape mark 55. Recording and reproduction of information on the tape 49 is performed by selecting a desired recording track 59 by reciprocally moving, by a head access mechanism (not shown), a recording/reproducing head (2-gap magnetic head having the function of deletion) 61 disposed in the vicinity of the capstan 51 a certain distance in units of microns in a direction b perpendicular to the direction shown by the arrow a.

Figure 6A:
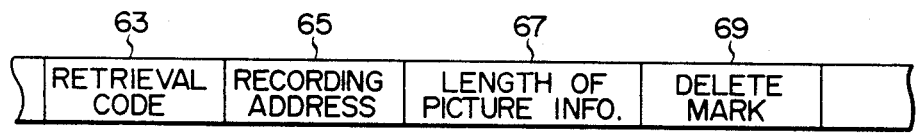
Figure 6B:
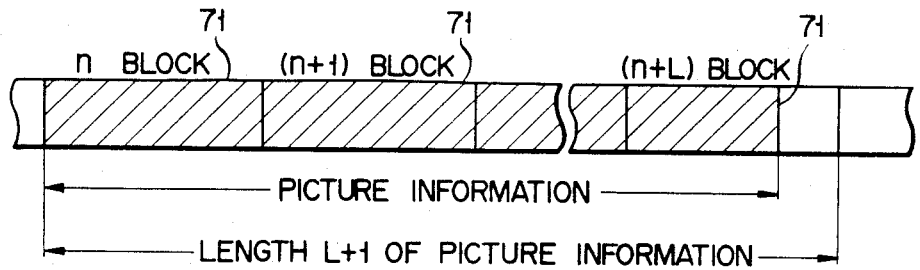
Figure 8:
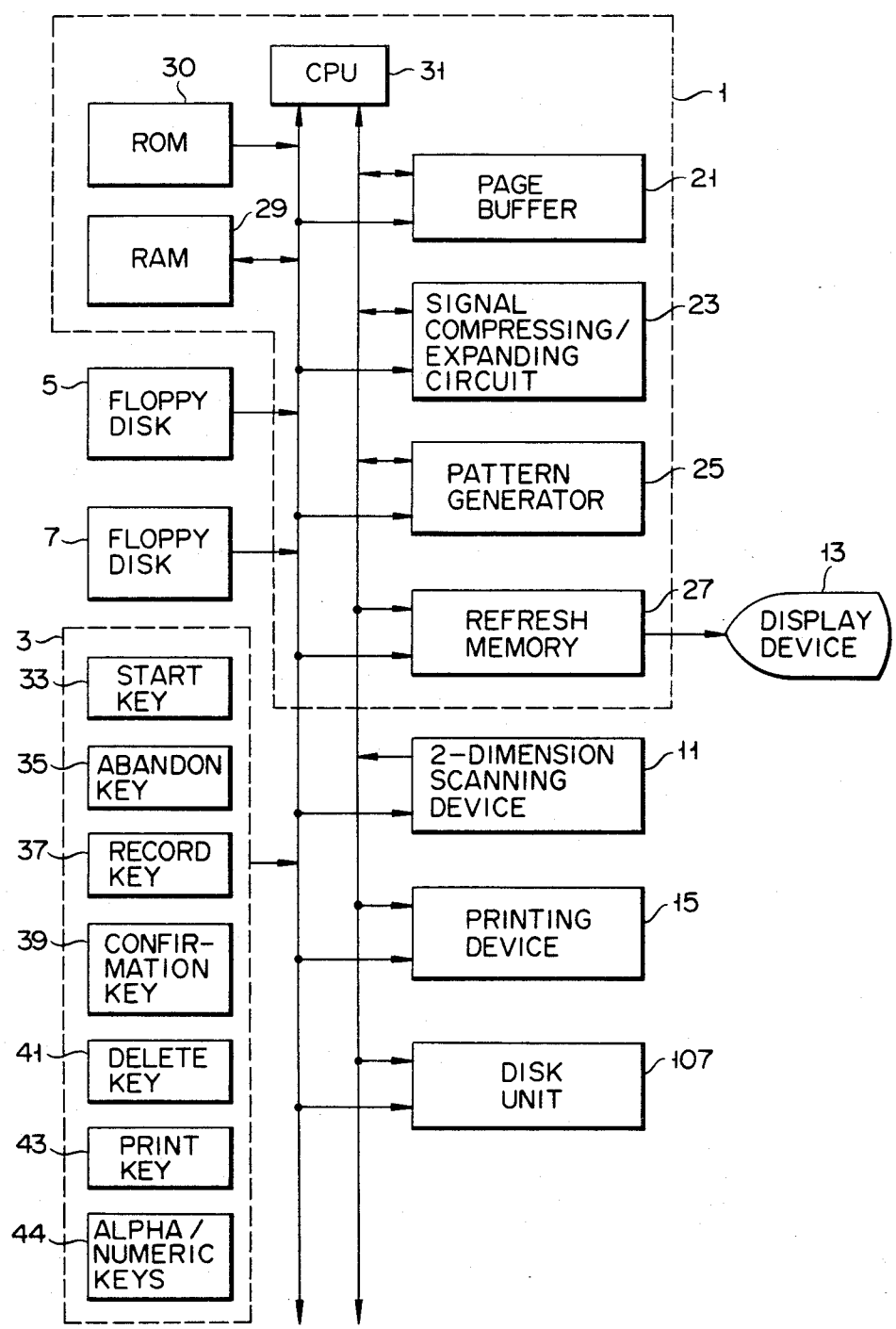
Figure 9:
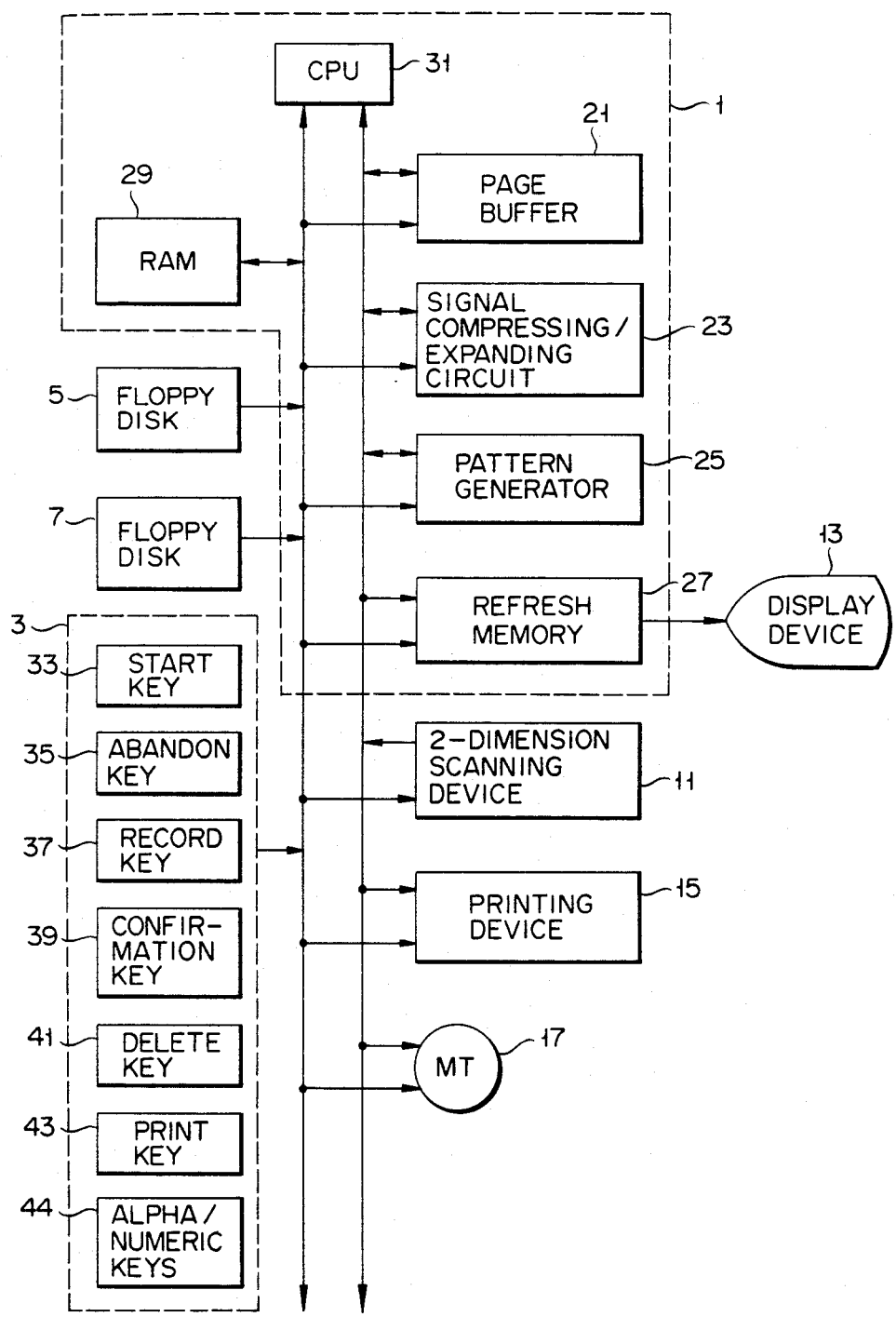

FIG. 6A shows the recording format of the respective retrieval titles on the retrieval title recording track $59_1$. The retrieval titles are sequentially recorded in a retrieval code recording area 63 which records the retrieval code; a recording address recording area 65 which records recording addresses of a track number and a block number of the track which stores the picture information corresponding to this retrieval code; a length of picture information recording area 67 which records the length of the picture information, that is, how many blocks are involved in storing this picture information; and a delete mark recording area 69 which records a delete mark representing whether or not the picture information corresponding to the retrieval code is deleted. FIG. 6B shows the recording format of the picture information in the information recording track $59_2$, wherein picture information 71 is recorded on a plurality of blocks.

Registration of the picture information with a picture information file device adopting the system for displaying picture information according to the present invention will be described with the flow chart shown in FIG. 7.

The registering mode is first set from the keyboard 3. This may be accomplished by inputting "1" when, for example, the display device displays messages of "registering mode: 1", "retrieval mode: 2", and "deleting mode: 3". When the registering mode is set, the retrieval code of the picture information to be registered is input from the keyboard 3 in step 73, and in step 75, the start key 33 is depressed. Upon this operation, the CPU 31 performs in step 79 checking of the input data such as checking of the number of digits, the kind of characters and so on according to the format of the retrieval code which is prepared in advance. The retrieval codes which are already registered are checked for double registration. If the retrieval code is the correct one, it is stored in the RAM 29. If the retrieval code is not the correct one, the program returns to step 73, and another retrieval code is input. In step 81, when the original is set by the operator for the 2-dimension scanning device 11 and, in step 83, the start key 33 is depressed, the CPU 31 operates the 2-dimension scanning device 11 and drives the magnetic tape 49. In step 85, the 2-dimension scanning device 11 performs 2-dimension scanning and photoelectric conversion of the picture information such as a document set in step 81. The line information which is photoelectrically converted is sequentially stored in the page buffer 21. When picture information corresponding to one page is stored in the page buffer 21, the picture information is stored in the refresh memory 27 and is displayed at the display device 13 in step 87.

In step 89, the operator checks on the display to determine if the original is set straight or bent, and if the density of the orignal matches with the binary encoding level of the 2-dimension scanning device 11. If the picture information is not satisfactory, the abandon key 35 is depressed in step 91. Then, the CPU 31 deletes the contents in the page buffer 21 and the refresh memory 27. If the original is not set straight or bent, the original is reset. If the density is improper, the binary encoding level of the 2-dimension scanning device 11 is adjusted. The program returns to step 81, the original is reset and the procedure as described above is performed again.

When the displayed image on the display device 13 is satisfactory, the record key 37 is depressed in step 93. Then, in step 95, the CPU 31 band-compresses, by the conventional MH (modified Hoffman) conversion at the signal compressing/expanding circuit 23, picture information of one unit stored in the page buffer 21 one by one scanning line, and supplies the compressed line information to the recording/reproducing head 61 of the magnetic tape device 17.

The recording/reproducing head 61 records the supplied picture information to the corresponding information recording track $59_2$. When recording of this picture information is completed, the CPU 31 reads out the recorded picture information (compressed information), expands by the MH inverse conversion at the signal compressing/expanding circuit 23 one by one scanning line, and supplies the expanded line information to the page buffer 21. When the reproduced picture information corresponding to one page is stored in the page buffer, the picture information is, in step 97, stored in the refresh memory 27 and is displayed at the display device 13. The CPU 31 also stores in the RAM 29 the track number, the block number and the length of the picture information of the recorded information in correspondence with the retrieval title.

Therefore, in step 99, the operator can check by the display if the picture information is recorded. If the displayed picture information is not satisfactory, the delete key 41 is depressed in step 101 to perform a deletion operation. When the satisfactory image is obtained during the checking in step 99, the operator depresses the confirmation key 39 in step 103. As a result, the CPU 31 supplies the retrieval title recorded in the RAM 29 to the recording/reproducing head 61 of the magnetic tape device 17.

The recording/reproducing head 61 records, in step 105, the supplied retrieval title, that is, the retrieval code, the track number, the block number, and the length of the picture information, in the retrieval title recording track $59_1$.

In summary, the display device 13 displays the information identical with the contents of the page buffer 21 which have not recorded on the magnetic tape 49. Hence it is possible to ascertain whether the original is placed slantwise, is bent or is unclear. Further, the picture information recorded on the magnetic tape 49 is reproduced and displayed by the display device 13. Thus it is possible to recognize whether or not the information has been correctly recorded.

In the embodiment described above, the present invention has been described with reference to the case wherein picture information such as a document is recorded on or reproduced from a magnetic tape device in a picture information file device. However, the present invention is similarly applicable to a magnetic tape device which records or reproduces other kinds of information. Furthermore, the present invention has also been described with reference to the case of a magnetic tape device which uses an endless magnetic tape as the recording medium. However, the present invention may be similarly applicable to other information recording devices such as a magnetic tape device which uses a general magnetic tape and not an endless magnetic tape, a magnetic disk device which uses a magnetic disk as a recording medium of the picture information as shown at 163 in FIG. 10, or an optical disk device which uses an optical disk as the recording medium.

In the embodiment shown in FIG. 3, the control programs are stored in the read-only memory device 30. However, they may alternatively be stored on the floppy disks 5, 7 shown in FIG. 11. Still alternatively, a first floppy disk 5, 7 or a second floppy disk 109 may be incorporated as shown in FIG. 12. In this case, the first floppy disk 5, 7 may store the control programs and the second floppy disk 109 may store the picture information.

What is claimed is:

1. A picture information filing apparatus which stores picture information and a retrieval title including a retrieval code for retrieving the picture information and outputs picture information corresponding to an input retrieval code, said filing apparatus comprising:

scanning means for scanning picture information;

buffer means for storing said scanned picture information;

display means for displaying said picture information stored in said buffer means;

keyboard input means for specifying abandonment of said picture infomation stored in said buffer means, when said displayed picture information does not satisfy prescribed requirements, and for specifying recording of said stored picture information, when said displayed picture information satisfies prescribed requirements;

compandor means for compressing and expanding said picture information;

external recording means for recording said picture information; and a microprocessor for abandoning said picture information stored in said buffer means, when abandonment of said stored picture information is specified by said keyboard input means, and for recording in said external recording means said picture information compressed by said compressor means, when recording of said picture information stored in said buffer means is specified by said keyboard input means.

2. A picture information filing apparatus according to claim 1, wherein said microprocessor reads out said picture information recorded in said external recording means and displays said read-out picture information on said display means, and said keyboard input means has a deletion function to specify deletion of said picture information displayed on said display means and a confirmation function to specify that said picture information recorded in said external recording means is valid, whereby said microprocessor records a retrieval code corresponding to said valid picture information in said external recording means.

3. A picture information filing apparatus according to claim 1, wherein said external recording means is an optical disk.

4. A picture information filing apparatus according to claim 1, wherein said external recording means is a floppy disk.

5. A picture information filing apparatus according to claim 1, wherein said external recording means is a magnetic tape.

6. A picture information filing apparatus according to claim 2, wherein said external recording means is an optical disk.

7. A picture information filing apparatus according to claim 2, wherein said external recording means is a floppy disk.

8. A picture infomation filing apparatus according to claim 2, wherein said external recording means is a magnetic tape.

* * * * *